United States Patent [19]
Martin et al.

[11] Patent Number: 5,285,864
[45] Date of Patent: Feb. 15, 1994

[54] HYDRAULIC POWER STEERING GEAR WITH COMPOSITE PLASTIC SUPPORTING BODY

[75] Inventors: Jon W. Martin, Los Alamitos; Thomas J. Engler, Los Angeles, both of Calif.

[73] Assignee: TRW Inc., Lyndhurst, Ohio

[21] Appl. No.: 981,000

[22] Filed: Nov. 24, 1992

[51] Int. Cl.$^5$ .............................................. B62D 5/06
[52] U.S. Cl. ................... 180/132; 180/148; 74/422; 74/498; 74/388 PS
[58] Field of Search ............... 180/132, 147, 148, 153, 180/154; 74/388 PS, 422, 498, 89.17

[56] References Cited

U.S. PATENT DOCUMENTS

| | | | |
|---|---|---|---|
| 3,777,589 | 12/1973 | Adams | 74/498 |
| 4,123,965 | 11/1978 | Brown et al. | 180/148 X |
| 4,347,090 | 8/1982 | Anderson et al. | 156/149 |
| 4,418,781 | 12/1983 | Rabe et al. | 74/388 PS |
| 4,809,806 | 3/1989 | Pietrzak | 180/148 |

OTHER PUBLICATIONS

Edward M. Silverman, Fiber Reinforcement Effects on Elevated Temperature Performance of Reinforced Thermoplastics, Jan. 16–19, 1984, 39th Annual Conference, Reinforced Plastics/Composites Institute, The Society of the Plastics Industry, Inc.

Primary Examiner—Margaret A. Focarino
Assistant Examiner—Victor E. Johnson
Attorney, Agent, or Firm—Tarolli, Sundheim & Covell

[57] ABSTRACT

A hydraulic power rack and pinion steering gear (10) includes a valve housing (32) and a hydraulic ram (20). The steering gear (10) further includes a composite plastic supporting body (12) which contains both the valve housing (32) and the hydraulic ram (20). The composite plastic supporting body (12) is formed of a high temperature thermoplastic binder material which is reinforced with glass fibers.

14 Claims, 2 Drawing Sheets

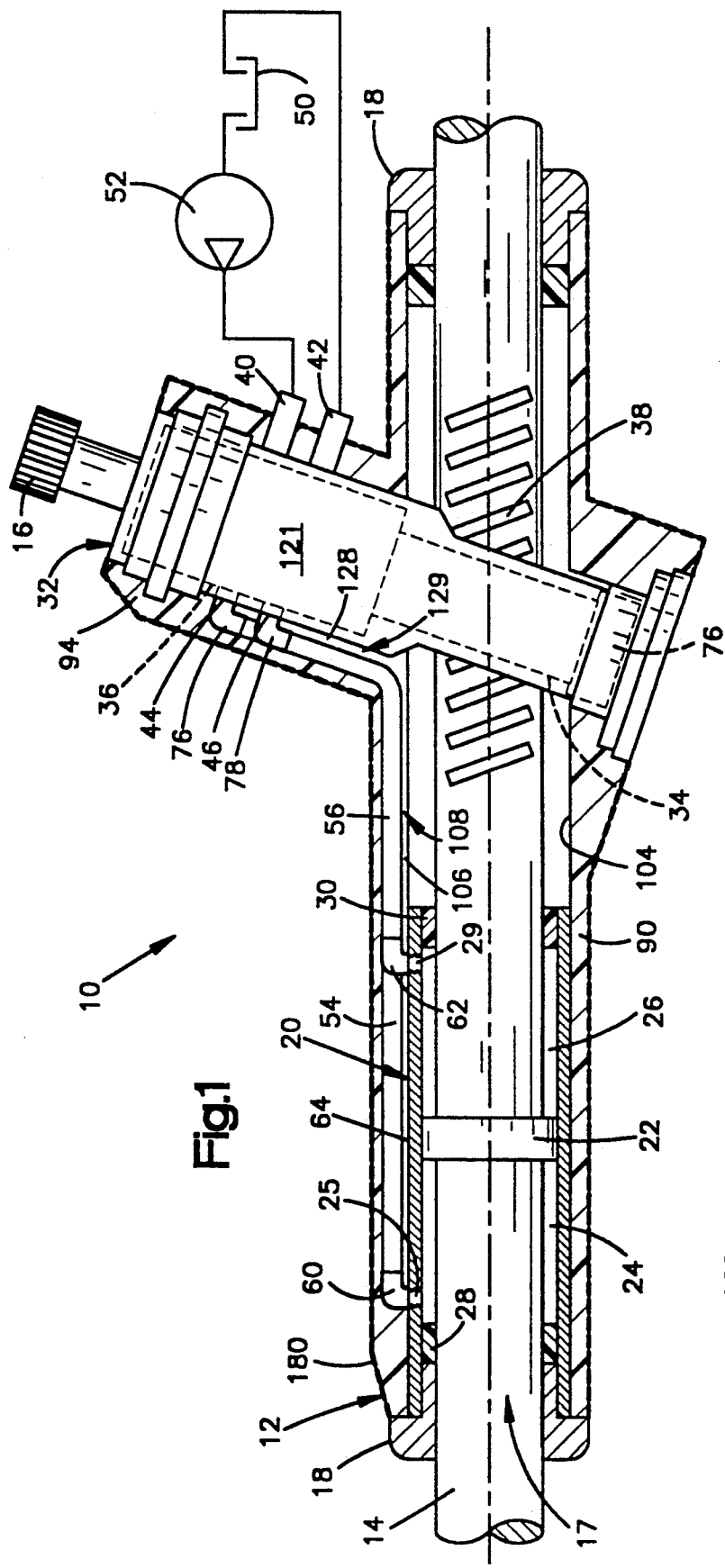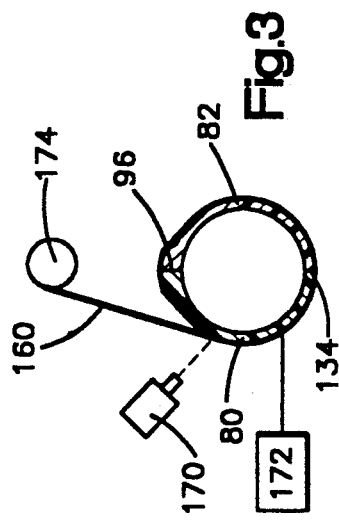

HYDRAULIC POWER STEERING GEAR WITH COMPOSITE PLASTIC SUPPORTING BODY

FIELD OF THE INVENTION

The present invention relates to a hydraulic power steering gear for steering a vehicle.

BACKGROUND OF THE INVENTION

U.S. Pat. No. 4,809,806 discloses a hydraulic power steering gear for steering a vehicle. The steering gear disclosed in the '806 patent is a rack and pinion steering gear which includes a hydraulic ram including a metal power cylinder. The steering gear also includes a metal support sleeve and a plastic shell. The metal power cylinder, together with a movable piston, defines first and second hydraulic fluid chambers. The first and second hydraulic fluid chambers are defined on opposite sides of the piston, which is fixed to the rack within the cylinder. The metal support sleeve has an upper end portion containing a hydraulic fluid control valve and has a lower end portion containing the pinion. The valve in the metal support sleeve operates in response to relative rotation between an input shaft and the pinion to direct a flow of pressurized hydraulic fluid against the piston in the metal power cylinder. The plastic shell extends between one end of the metal power cylinder and the lower end portion of the metal support sleeve. The plastic shell and the metal support sleeve together form a metal/plastic housing for the valve and the pinion.

SUMMARY OF THE INVENTION

In accordance with the present invention, a hydraulic power steering gear for an automotive vehicle includes a rotatable input member, a hydraulic fluid control valve, and a valve housing. The steering gear also includes a hydraulic ram comprising a cylinder and a piston, and an output member operatively connected to the piston. The hydraulic fluid control valve is operative to control fluid flow and pressure in response to rotation of the input member. The valve housing is formed of metal and contains the valve. The hydraulic ram cylinder also is formed of metal. Hydraulic fluid flow and pressure from a hydraulic pump are directed to the piston in the hydraulic ram cylinder in response to operation of the valve in the valve housing. The steering gear further includes a composite plastic supporting body containing both the valve housing and the hydraulic ram cylinder.

The steering gear is constructed efficiently in accordance with the present invention. The thicknesses of the metal walls of the hydraulic ram cylinder and the valve housing can be reduced in comparison with the prior art because a substantial portion of the strength of the steering gear is provided by the composite plastic supporting body which contains both the hydraulic ram cylinder and the valve housing. The metal in the valve housing and the hydraulic ram cylinder is used primarily to provide a consistent, good sealing, wear resistant surface. The hydraulic fluid pressures which act outwardly against the walls of the hydraulic ram cylinder and the valve housing are constrained substantially by the composite plastic material surrounding the metal bodies. The weight of the steering gear is thus reduced as a result of the reduced volume of metal, which has a greater mass than the composite plastic material which is used in place of the metal.

In a preferred embodiment of the present invention, the composite plastic supporting body is formed of a pair of side parts that are located in adjoining positions on opposite sides of the hydraulic ram cylinder and the valve housing. Each of the side parts is formed of a composite fiber reinforced material. The composite fiber reinforced material comprises a plastic polymer binder material which may, or may not, have glass fibers embedded in the binder material.

The two side parts of the composite plastic supporting body are joined to each other and substantially strengthened by a composite fiber reinforced tape which is wrapped around the two side parts. The tape comprises a plastic polymer binder material and glass fibers embedded in the binder material. The tape is heated as it is being wrapped around the two side parts. The plastic material at the inner surface of the tape and the plastic material at the outer surface of the side parts are thus partially melted, and fuse. Additionally, glass reinforcing fibers in the tape become embedded in the plastic material of the side parts. The steering gear supporting body is thus formed essentially as one piece with a continuous, fiber reinforced outer layer that extends over both side parts. The outer layer includes the materials of the tape which are fused with and embedded in the material of the side parts.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic view of a steering assembly including a hydraulic power rack and pinion steering gear constructed in accordance with the present invention;

FIG. 3 is a schematic illustration of an assembly process for the steering gear of FIG. 1.

DESCRIPTION OF A PREFERRED EMBODIMENT

Figure 2:
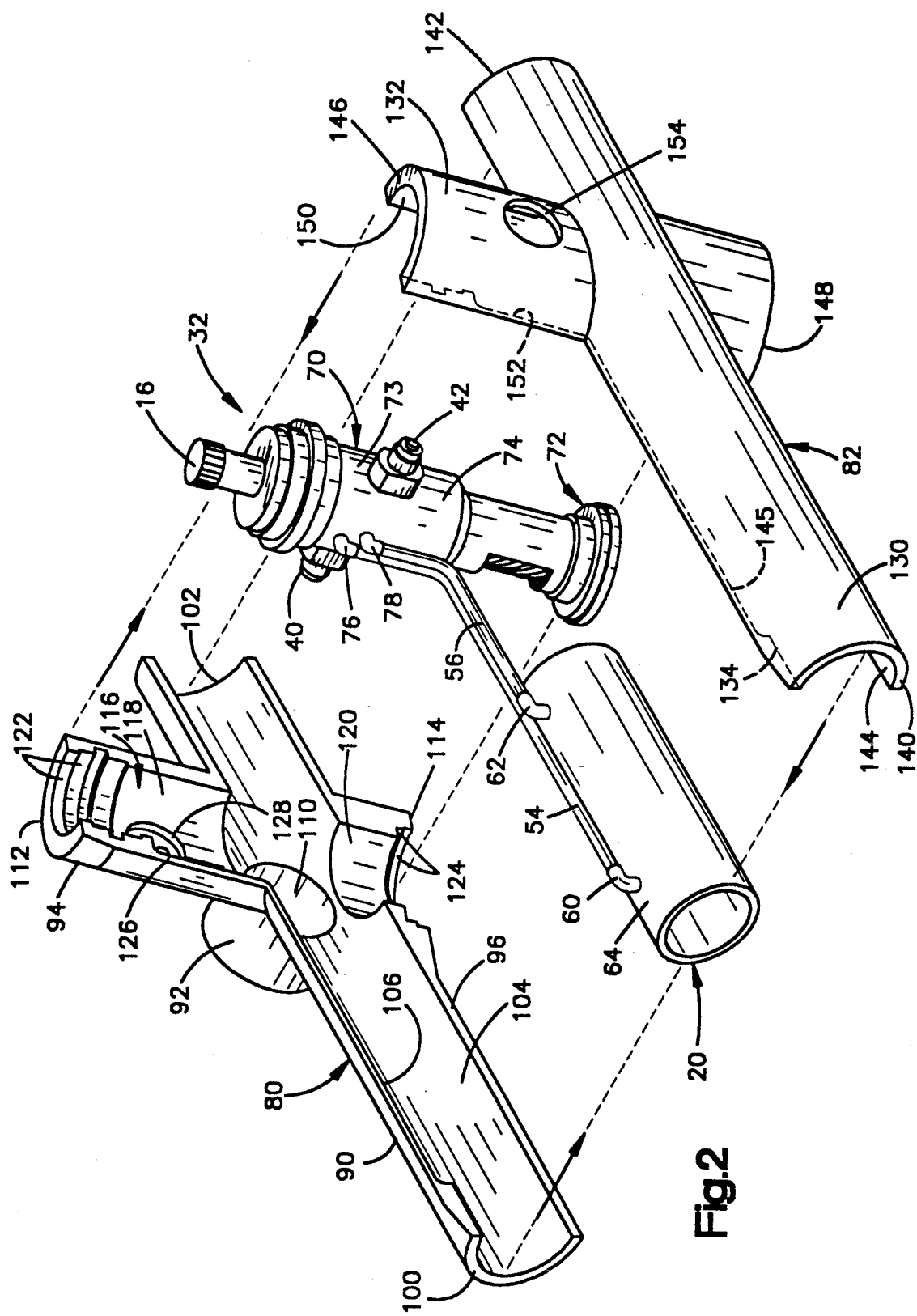
FIG. 2 is an exploded schematic view showing parts of the apparatus of FIG. 1 in somewhat greater detail.

A hydraulic power steering gear 10 constructed in accordance with the present invention is shown schematically in FIG. 1. The steering gear 10 is a hydraulically-assisted rack and pinion steering gear including a supporting body 12, an elongate rack 14 and an input shaft 16. The rack 14 extends through a passage 17 in the supporting body 12, and is supported for longitudinal movement in the passage 17 by a pair of bushings 18. The rack 14 has opposite end portions (not shown) which are connectable with a pair of steerable vehicle wheels through a steering linkage in a known manner. The input shaft 16 is connectable with a manually operated vehicle steering wheel, and is rotatable in response to rotation of the steering wheel by an operator of the vehicle. The steering gear 10 operates to move the rack 14 longitudinally in the supporting body 12 in response to rotation of the input shaft 16. The steering gear 10 thus actuates the steering linkage to effect steering movement of the steerable vehicle wheels in response to rotation of the steering wheel.

As further shown in FIG. 1, the supporting body 12 contains a hydraulic ram cylinder 20 through which the rack 14 extends. A piston 22 is fixed to the rack 14 within the ram cylinder 20. The piston 22 and the ram cylinder 20 define first and second variable volume hydraulic fluid chambers 24 and 26 within the ram cylinder 20 on opposite sides of the piston 22. The first chamber 24 has a first port 25, and is sealed by the piston 22 and a first hydraulic seal 28. The second chamber 26 has a second port 29, and is sealed by the piston 22 and a second hydraulic seal 30.

The supporting body 12 also contains a valve housing 32. The valve housing 32 contains a pinion gear 34 and a hydraulic fluid control valve 36. Gear teeth on the pinion gear 34 mesh with rack teeth 38 on the rack 14. The valve housing 32 has a hydraulic fluid inlet 40 and a hydraulic fluid outlet 42, as shown schematically in FIG. 1. The valve housing 32 also has a pair of hydraulic fluid ports 44 and 46. The valve 36 in the valve housing 32 defines portions of the hydraulic fluid flow paths which communicate the inlet 40 and the outlet 42 with the two ports 44 and 46.

The hydraulic ram cylinder 20 communicates with a hydraulic fluid reservoir 50 and a pump 52 through the valve housing 32 and the hydraulic fluid control valve 36. Specifically, the first chamber 24 in the ram cylinder 20 communicates with the valve 36 through a first metal tube 54 which extends between the first port 25 in the ram cylinder 20 and the first port 44 in the housing 32. The second chamber 26 in the ram cylinder 20 communicates with the valve 36 through a second metal tube 56 which extends between the second port 29 in the ram cylinder 20 and the second port 46 in the housing 32. The valve 3 receives hydraulic fluid from the reservoir 50 and the pump 52 through the inlet 40 in the housing 32, and exhausts hydraulic fluid to the reservoir 50 through the outlet 42 in the housing 32.

The hydraulic fluid control valve 36 operates in response to rotation of the input shaft 16 with the vehicle steering wheel. When the input shaft 16 rotates with the vehicle steering wheel in a first direction, it rotates slightly, i.e., between 0.0° and approximately 3.0°, relative to the pinion gear 34. The valve 36 responds to the relative rotational displacement by opening hydraulic fluid flow paths which extend from the inlet 40 to the first port 44 in the housing 32, and by opening hydraulic fluid flow paths which extend from the second port 46 in the housing 32 to the outlet 42. The valve 36 thus communicates the pump 52 with the first hydraulic chamber 24 to pressurize the first hydraulic chamber 24, and simultaneously communicates the second hydraulic chamber 26 with the reservoir 50 to vent the second hydraulic chamber 26. The flow from the pump 52 and the hydraulic fluid pressure differential acting across the piston 22 cause the piston 22 and the rack 14 to move to the right, as viewed in FIG. 1. The steering linkage connected with the rack 14 responds to such movement of the rack 14 and steers the steerable vehicle wheels in a first direction.

As the rack 14 moves with the piston 22, the pinion gear 34 rotates in meshing engagement with the rack teeth 38. The pinion gear 34 is thus rotated relative to the input shaft 16 in a follow-up manner and provides a relative rotation cancelling rotation in the valve 36. The valve 36 responds to follow-up rotation of the pinion gear 34 relative to the input shaft 36 by returning to a neutral, open center position closing the previously opened hydraulic fluid flow paths communicating the hydraulic ram cylinder 20 with the reservoir 50 and the pump 52. The valve 36 also equalizes the hydraulic fluid pressures acting on the piston 22 in the first and second hydraulic chambers 24 and 26. The piston 22 and the rack 14 stop moving when the pressures in the chambers 24 and 26 equalize.

When the vehicle wheels are to be steered in a second direction, the input shaft 16 is rotated with the steering wheel in a second direction, and is again rotated slightly relative to the pinion gear 34. The valve 36 responds by pressurizing the second hydraulic fluid chamber 26 and venting the first hydraulic fluid chamber 24 to the reservoir 50. The piston 22 and the rack 14 then move to the left as viewed in FIG. 1. The resulting follow-up rotation of the pinion gear 34 relative to the input shaft 16 subsequently causes the valve 36 to equalize the hydraulic fluid pressures in the two chambers 24 and 26. The steering gear 10 thus effects steering movement of the vehicle wheels in a direction and an amount corresponding to the direction and amount of rotation of the steering wheel and the input shaft 16.

Parts of the steering gear 10 are shown in greater detail in FIG. 2. As shown in FIG. 2, a pair of elbow adapters 60 and 62 are fixed, such as by brazing or welding, to the cylindrical outer surface 64 of the hydraulic ram cylinder 20. The elbow adapters 60 and 62 support the associated ends of the first and second metal tubes 54 and 56 in fluid communication with the first and second ports 25 and 29 (FIG. 1) in the ram cylinder 20, respectively.

The valve housing 32 is also shown in greater detail in FIG. 2. The valve housing 32 comprises a tubular member 70 and a cap 72. The tubular member 70 has an upper end portion 73 with a cylindrical outer surface 74. The upper end portion 73 of the tubular member 70 contains the hydraulic fluid control valve 36. The cap 72 closes the lower end of the tubular member 70, and supports a bearing 76 (FIG. 1). The bearing 76 supports the lower end of the pinion 34 for rotation in the tubular member 70. The hydraulic fluid inlet 40 and the hydraulic fluid outlet 42 are formed as bosses which are fixed, such as by brazing or welding, to opposite sides of the cylindrical outer surface 74 over ports (not shown) which extend through the upper end portion 73 of the tubular member 70. A pair of elbow adapters 76 and 78 are also fixed to the cylindrical outer surface 74. The elbow adapters 76 and 78 support the associated ends of the first and second metal tubes 54 and 56 in fluid communication with the first and second ports 44 and 46 (FIG. 1) in the valve housing 32, respectively. The valve housing 32 is thus constructed in accordance with the invention disclosed in co-pending U.S. patent application Ser. No. 689,009, filed Apr. 22, 1991, entitled "Power Steering Assembly".

As shown in FIG. 1, the supporting body 12 has a fully assembled condition in which it contains and supports the hydraulic ram cylinder 20 and the valve housing 32 in positions fixed relative to each other. As shown in FIG. 2, the supporting body 12 has a partially assembled condition in which it comprises first and second side parts 80 and 82. The side parts 80 and 82 are preferably formed of a composite material which comprises a plastic binder material and a reinforcing material. The plastic binder material is preferably a high temperature thermoplastic resin, such as polyphenylene sulfide (PPS). The reinforcing material preferably comprises glass fibers. When the supporting body 12 is in its fully assembled condition, the first and second side parts 80 and 82 adjoin each other on opposite sides of the hydraulic ram cylinder 20 and the valve housing 32. The side parts 80 and 82 thus enclose the hydraulic ram cylinder 20 and the valve housing 32 within the assembled supporting body 12.

The first side part 80 of the supporting body 12 has an elongate horizontal section 90, a relatively short horizontal section 92, and a substantially vertical tower section 94. The first side part 80 also has an edge surface 96 which extends about the elongate horizontal section 90 and the tower section 94.

The elongate horizontal section 90 of the first side part 80 has opposite ends 100 and 102, and has an inner surface 104 which extends longitudinally between the opposite ends 100 and 102. The inner surface 104 has a semi-cylindrical shape, and is thus shaped to define one-half of the passage 17 through which the rack 14 extends, as shown in FIG. 1. The elongate horizontal section 90 further has a recessed inner surface 106. The recessed inner surface 106 extends longitudinally from the tower section 94 to a location spaced from the first end 100 of the elongate horizontal section 90. The recessed inner surface 106 thus defines one-half of a recess 108 above the passage 17. As shown in FIG. 1, the recess 108 receives and contains the horizontally extending portions of the metal tubes 54 and 56, as well as the elbow adapters 60 and 62, when the supporting body 12 is in its fully assembled condition.

The relatively short horizontal section 92 of the first side part 80 has a cylindrical inner surface 110. The cylindrical inner surface 110 is adapted to support a spring loaded rack yoke mechanism (not shown) which biases the rack 14 transversely against the pinion gear 34 so that the rack teeth 38 mesh firmly with the gear teeth on the pinion gear 34. Such a spring loaded rack yoke mechanism in a hydraulic power rack and pinion steering assembly is known in the art.

The tower section 94 of the first side part 80 has an upper end 112, a lower end 114, and an inner surface 116. The inner surface 116 has an upper area 118 located above the elongate horizontal section 90, and has a lower area 120 located below the elongate horizontal section 90. Each of the inner surface areas 118 and 120 has a semi-cylindrical shape. The inner surface areas 118 and 120 are thus shaped to define associated upper and lower portions of an interior space 121 within the supporting body 12 in which the valve housing 32 is located. Specifically, the upper surface area 118 includes a plurality of individual areas 122 which are sized and shaped to register with complementary areas of the cylindrical outer surface 74 of the tubular member 70. The lower surface area 120 similarly includes individual areas 124 that are sized and shaped to register with corresponding surface areas on the cap 72.

The tower section 94 of the first side part 80 further has a recessed inner surface 126 and an annular inner surface 128. The recessed inner surface 126 defines one-half of a recess 129 beside the interior space 121. As shown in FIG. 1, the recess 129 receives and contains the vertically extending portions of the metal tubes 54 and 56, as well as the elbow adapters 76 and 78, when the supporting body 12 is in its fully assembled condition. The annular inner surface 128 defines an aperture through which the hydraulic inlet boss 40 is receivable.

The second side part 82 of the supporting body 12 similarly has an elongate horizontal section 130, a substantially vertical tower section 132, and an edge surface 134. The edge surface 134 of the second side part 82 is coextensive with the edge surface 96 of the first side part 80.

The horizontal section 130 of the second side part 82 has opposite ends 140 and 142, and has an inner surface 144 which extends longitudinally between the opposite ends 140 and 142. The inner surface 144 of the horizontal section 130 has a semi-cylindrical shape, and is thus shaped to define the other half of the passage 17. The horizontal section 130 further has a recessed inner surface 145. The recessed inner surface 145 defines the other half of the recess 108 above the passage 17.

The tower section 132 of the second side part 82 has an upper end 146, a lower end 148, and an inner surface 150. Like the inner surface 116 described above with reference to the first side part 80, the inner surface 150 includes individual surface areas that are shaped to register with corresponding surface areas on the valve housing 32. The inner surface 150 is thus shaped to define associated upper and lower portions of the interior space 121.

The tower section 132 of the second side part 82 further has a recessed inner surface 152 and an annular inner surface 154. The recessed inner surface 152 defines the other half of the recess 129 beside the interior space 121. The annular inner surface 154 defines an aperture through which the hydraulic outlet boss 42 is receivable.

The first and second side parts 80 and 82 of the supporting body 12 are movable relative to the hydraulic cylinder 20 and the valve housing 32 in directions toward each other, as indicated by the arrows shown in FIG. 2. The first and second side parts 80 and 82 are thus movable into positions in which they adjoin each other on opposite sides of the hydraulic ram cylinder 20 and the valve housing 32.

When the first and second side parts 80 and 82 are in their adjoining positions, the edge surfaces 96 and 134 abut each other. The edge surfaces 96 and 134 then define a seam between the two side parts 80 and 82. The semi-cylindrical inner surfaces 104 and 144 of the horizontal sections 90 and 130 are located opposite each other to form a cylindrical wall which defines the passage 17. A portion of each inner surface 104 and 144 then coextensively abuts a respective side of the cylindrical outer surface 64 of the hydraulic ram cylinder 20. The inner surfaces 104 and 144 thus support the hydraulic ram cylinder 20 within the passage 17.

The inner surfaces 116 and 150 of the tower sections 94 and 132 are likewise located opposite each other to define the upper and lower portions of the interior space 121. An intermediate portion of the interior space 121 is defined by the part of the passage 17 that extends through the tower sections 94 and 132. The valve housing 32 is held firmly in the interior space 121 in surface contact with the adjacent portions of the inner surfaces 116 and 150. Additionally, the recessed inner surfaces 106, 145, 126 and 152 are located opposite each other to define the recesses 108 and 129 in which the metal tubes 54 and 56 and the elbow adapters 60, 62, 76 and 78 are located. The hydraulic inlet and outlet bosses 40 and 42 extend through the associated apertures defined by the annular inner surfaces 128 and 154.

After the first and second side parts 80 and 82 of the supporting body 12 have been moved into their adjoining positions on opposite sides of the hydraulic ram cylinder 20 and the valve housing 32, they are joined to each other to form the supporting body 12 as one continuous piece. As shown schematically in FIG. 3, the side parts 80 and 82 are joined to each other with the use of a tape 160. Like the side parts 80 and 82, the tape 160 is preferably formed of a composite material which comprises a plastic binder material and a reinforcing material. The plastic binder material of the tape 160 is preferably the same as the plastic binder material of the side parts 80 and 82. The plastic binder material of the tape 160 is therefore most preferably PPS. The reinforcing material of the tape 160 most preferably comprises continuous glass fibers. One such tape is supplied by Baycomp of Ontario, Canada.

The tape 160 is placed in tension and wrapped around the two side parts 80 and 82 so as to completely cover the outer surfaces of the two side parts 80 and 82. As the tape 160 is being wrapped around the side parts 80 and 82, it is heated at the point of tangency between the tape 160 and the underlying side part 80 or 82, such as with a laser 170. A suitable robot 72 can be operated by one skilled in the art to manipulate the adjoining side parts 80 and 82 relative to a tape spool 174 and the laser 170 so that the tape 160 is wrapped and heated in a continuous process. The plastic binder material of the tape 160 is melted, i.e., heated to or somewhat above its phase transformation temperature, as the tape 160 is being wrapped.

The plastic binder material of the underlying side parts 80 and 82 is superficially melted beneath the tape 160 as the tape 160 is being wrapped and heated. The melted binder material of the tape 160 becomes fused with the melted binder material of the underlying side parts 80 and 82. The glass fibers in the tape 160 become embedded in the superficially melted binder material of the side parts 80 and 82 by the force of the tension in the tape 160. This results in the formation of a continuous outer layer 180 of the supporting body 12 which extends across the seam and over the two side parts 80 and 82. The continuous outer layer 180 is formed by the fused plastic binder materials of the tape 160 and the side parts 80 and 82, the embedded glass fibers which were originally part of the tape 160, and the glass fibers which were originally part of the side parts 80 and 82. The supporting body 12 is thus formed as one continuous piece.

The hydraulic ram cylinder 20 and the valve housing 32 are formed of metal, preferably steel, in order to withstand the elevated temperatures experienced in the steering gear 10. However, the thickness of the metal materials of the hydraulic ram cylinder 20 and the valve housing 32 can be reduced in comparison with the prior art because the strength of the steering gear 10 is provided substantially by the supporting body 12. Specifically, the hydraulic fluid pressures acting radially outward against the cylindrical walls of the hydraulic ram cylinder 20 and the valve housing 32 are resisted substantially by the surrounding composite plastic material of the supporting body 12. The steering gear 10 is thus constructed efficiently in accordance with the invention because its weight and cost are reduced as a result of the reduced volume of the metal ram cylinder 20 and the metal valve housing 32 which are required to construct a steering gear housing of adequate strength.

From the above description of the invention, those skilled in the art will perceive improvements, changes and modifications. Such improvements, changes and modifications within the skill of the art are intended to be covered by the appended claims.

Having described the invention, the following is claimed:

1. In a hydraulic power steering gear comprising:
   a rotatable input member;
   a valve housing formed of metal;
   a hydraulic fluid control valve responsive to rotation of said input member, said valve being contained in said valve housing and defining hydraulic fluid flow paths through said valve within said valve housing;
   a hydraulic ram cylinder formed of metal and containing a piston, said ram cylinder and said piston defining at least one variable volume hydraulic fluid chamber within said ram cylinder; and
   means for directing pressurized hydraulic fluid to said fluid flow paths and to said fluid chamber in response to operation of said valve, said pressurized hydraulic fluid applying pressure outwardly against said valve housing from said fluid flow paths and applying pressure outwardly against said ram cylinder from said fluid chamber;
   the improvement comprising:
   supporting means for resisting said pressures applied outwardly against said valve housing and said ram cylinder by said pressurized hydraulic fluid, said supporting means comprising a composite plastic supporting body which contains both said valve housing and said ram cylinder, said composite plastic supporting body having a pressure-bearing inner surface means extending substantially coextensively over said valve housing and said ram cylinder, said pressure-bearing inner surface means being subjected to and resisting said pressures applied outwardly against said valve housing and said ram cylinder.

2. A steering gear as defined in claim 1 wherein said valve housing has a cylindrical outer surface portion surrounding said fluid flow paths, said pressure-bearing inner surface means including a cylindrical inner surface portion of said composite plastic supporting body which extends circumferentially around said cylindrical outer surface portion of said valve housing in pressure-bearing relationship with said cylindrical outer surface portion of said valve housing to bear at least a portion of said pressure applied outwardly against said valve housing.

3. A steering gear as defined in claim 1 wherein said ram cylinder has a cylindrical outer surface portion surrounding said fluid chamber, said pressure-bearing inner surface means further including a cylindrical inner surface portion of said composite plastic supporting body which extends circumferentially around said cylindrical outer surface portion of said ram cylinder in pressure-bearing relationship with said cylindrical outer surface portion of said ram cylinder to bear at least a portion of said pressure applied outwardly against said ram cylinder.

4. A steering gear as defined in claim 1 wherein said means for directing pressurized hydraulic fluid includes a hydraulic fluid tube communicating said valve with said ram cylinder, said composite plastic supporting body having a recessed inner surface means for defining a recess in which said tube is contained within said composite plastic supporting body.

5. A steering gear as defined in claim 1 wherein said composite plastic supporting body includes a plurality of continuous glass fibers extending completely around said pressure-bearing inner surface means.

6. A steering gear as defined in claim 5 wherein the material of which said composite plastic supporting body is formed comprises a first composite plastic material and tape, said first composite plastic material comprising at first plastic binder material and a reinforcing material embedded in said first plastic binder material, said tape comprising a second plastic binder material, said plurality of continuous glass fibers being components of said tape and being embedded in said second plastic binder material.

7. A steering gear as defined in claim 6 wherein said continuous glass fibers in said tape are further embedded in said first plastic binder material, said second plastic binder material being fused with said first plastic binder material.

8. A steering gear as defined in claim 7 wherein said second plastic binder material is the same material as said first plastic binder material.

9. A steering gear as defined in claim 1 wherein said composite plastic supporting body has a plurality of parts which are rigidly joined to each other, said parts being located in adjoining positions and having adjoining edge surface means for defining at least one seam therebetween, said composite plastic supporting body further having a layer extending across said one seam and rigidly interconnecting the parts that define said one seam, said layer including continuous glass fibers that extend across said one seam.

10. A steering gear as defined in claim 9 wherein said continuous glass fibers extent completely around said parts that define said one seam.

11. A steering gear as defined in claim 10 wherein said continuous glass fibers are components of a composite plastic tape which extends completely around said parts that define said one seam.

12. In a hydraulic power steering gear comprising:
a rotatable input member;
a hydraulic fluid control valve responsive to rotation of said input member, said valve defining hydraulic fluid flow paths through said valve;
a valve housing formed of metal, said valve housing containing said valve and having a cylindrical outer surface portion surrounding said fluid flow paths;
a hydraulic ram cylinder formed of metal and containing a piston, said ram cylinder and said piston defining at least one variable volume hydraulic fluid chamber within said ram cylinder, said ram cylinder having a cylindrical outer surface portion surrounding said fluid chamber; and
means for directing pressurized hydraulic fluid to said fluid flow paths and to said fluid chamber in response to operation of said valve, said pressurized hydraulic fluid applying pressure outwardly against said valve housing from said fluid flow paths and applying pressure outwardly against said ram cylinder from said fluid chamber;
the improvement comprising:
supporting means for resisting said pressures applied outwardly against said valve housing and said ram cylinder by said pressurized hydraulic fluid, said supporting means comprising a composite plastic supporting body which contains both said valve housing and said ram cylinder, said composite plastic supporting body having a pressure-bearing inner surface means extending over said valve housing and said ram cylinder, said pressure-bearing inner surface means being subjected to and resisting said pressures applied outwardly against said valve housing and said ram cylinder;
said pressure-bearing inner surface means including a cylindrical inner surface portion of said composite plastic supporting body which extends circumferentially around said cylindrical outer surface portion of said valve housing in pressure-bearing relationship with said cylindrical outer surface portion of said valve housing to bear at least a portion of said pressure applied outwardly against said valve housing;
said pressure-bearing inner surface means further including a cylindrical inner surface portion of said composite plastic supporting body which extends circumferentially around said cylindrical outer surface portion of said ram cylinder in pressure-bearing relationship with said cylindrical outer surface portion of said ram cylinder to bear at least a portion of said pressure applied outwardly against said ram cylinder; and
said composite plastic supporting body including a plurality of continuous glass fibers that extend completely around said cylindrical outer surface portion of said valve housing and said cylindrical outer surface portion of said ram cylinder.

13. A steering gear as defined in claim 12 wherein the material of which said composite plastic supporting body is formed comprises a first composite plastic material and tape, said first composite plastic material comprising a first plastic binder material and a reinforcing material embedded in said first plastic binder material, said tape comprising a second plastic binder material, said plurality of continuous glass fibers being components of said tape and being embedded in said second plastic binder material.

14. A steering gear as defined in claim 13 wherein said second plastic binder material is the same material as said first plastic binder material.

* * * * *